May 2, 1961     W. C. JEFF     2,982,670
METHOD AND COMPOSITION FOR FORMING A TEXTURED
FINISH AND RESULTING PRODUCT
Filed July 15, 1958

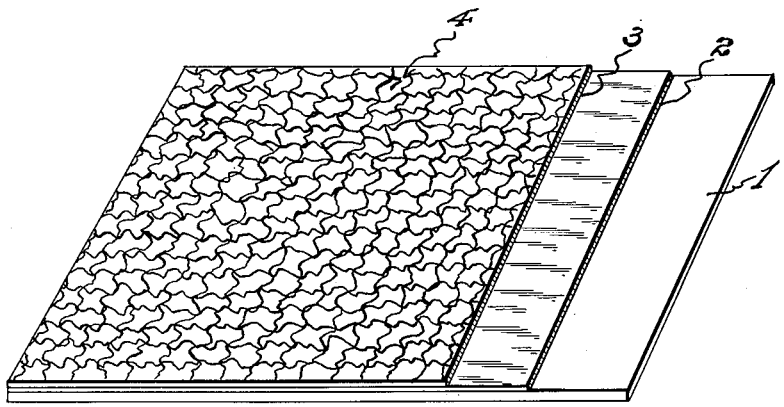

1 - The surface to be coated.

2 - Lower layer of alkyd resin or modified alkyd resin.

3 - Upper layer from mixture of thermoplastic resin in dispersed and dissolved form and thermosetting melamine-formaldehyde resin.

4 - Textured appearance.

INVENTOR.
William C. Jeff,
BY Richards and Gifelli,
Attorneys

United States Patent Office 2,982,670
Patented May 2, 1961

2,982,670

METHOD AND COMPOSITION FOR FORMING A TEXTURED FINISH AND RESULTING PRODUCT

William C. Jeff, North Plainfield, N.J., assignor to John L. Armitage & Co., Inc., Newark, N.J., a corporation of New Jersey Filed July 15, 1958, Ser. No. 748,615

8 Claims. (Cl. 117—41)

This invention relates to a novel method and composition for forming a textured coating and to the novel textured product resulting therefrom.

In the field of resinous coatings it is well-known to provide such coatings or finishes in smooth or in patterned forms, the coating materials being pigmented or unpigmented. With respect to patterned coatings, as the term is used herein, they are prepared, in the main, in three different ways. The first method developed for making patterned coatings involved the use of so-called "wrinkle" materials, i.e., those materials which contain drying oils which upon aging form irregular films resembling wrinkles; hence the name. A second method involves the use of a so-called spatter coat, which is generally sprayed over the surface to be coated in the form of discrete particles which come in contact with only a part of said surface, thereby giving a non-homogeneous or patterned finish thereto. The third method for obtaining a patterned finish is exemplified by the teachings of U.S. Patent No. 2,715,587 and involves first forming a smooth finish with a film-forming material and then applying thereover a so-called texturing agent such as an organic solvent to cause a change in the appearance of the coating from that of a smooth film to that of a patterned finish. The finishes resulting from the third method are different in appearance from those obtained by the other two methods and are often referred to as leatherlike or textured finishes in contradistinction to the wrinkle finishes or spattered finishes. Such textured finishes are preferred for many uses, such as for coatings on office machines such as typewriters, dictating machines, data processing machines and the like, and on vending machines, furniture, wall coverings and molded fiberglass plastics, etc.

While the aforesaid third method, which results in textured finishes, possesses many desirable attributes, it nevertheless has the disadvantage that it requires the use of a solvent texturing agent thereby adding to the time and cost of making such finishes. The use of such an agent involves an additional manipulative step separate and apart from the film forming composition, following the application of the coating material and it also involves the additional cost of the texturing solvent (which is subsequently evaporated or driven off).

In accordance with the method of the present invention, textured, leather-like coatings of the type formed by the aforementioned third method are made in a simpler manner than heretofore. Also, the resulting textured finish possesses a unique laminal structure.

The foregoing stated results have been attained in accordance with this invention by a method which involves, essentially, applying any film-forming material as hereinafter specified over a surface to be coated, permitting the resulting coating to dry to the touch, then applying over this coating another film-forming composition containing a dispersed vinyl or other thermoplastic resin, and a dissolved resin compatible therewith, whereupon a texturing effect is almost immediately produced. The thus coated system is then baked at an elevated temperature until cured. The accompanying drawing shows an article made in accordance herewith, with an indication of the materials used and broken away for purposes of illustration.

It is essential for the purposes of the present invention that the aforesaid base coating material be incompatible, i.e., substantially non-miscible, with the material used for the top or texturing coating. At the same time, there should be sufficient adhesion between the aforesaid two coatings in the final or cured state, so that the coatings will adhere to each other and will not de-laminate under normal conditions of use.

In the event a base coating which is not incompatible with the top coating is employed, the results are not reproducible and the texturing which may result is not regular or pleasing in appearance. While it is not intended that I be held to the correctness of any theoretical explanation for this phenomenon, it is presently believed that the irregular and non-pleasing appearance in such cases is caused by the fact that the base and top coats do not possess sufficient dissimilarity as respects composition and hence physico-chemical properties such as adhesion.

On the other hand, it is my belief that a regular and pleasing texture finish in accordance with the present invention is obtained by the action of the balanced lack of cohesion of the dispersed and dissolved resins in the texture coat at the interface of the incompatible base coat.

The base coat composition used in accordance with this invention may vary widely in composition. It should include an oil-modified alkyd resin, preferably a so-called short oil alkyd resin, modified with a melamine thermosetting resin, such as a melamine-formaldehyde resin. The composition may include resinous binders such as short, medium or long oil alkyds, urea-formaldehyde resin, phenolic resins, epoxy resins, chlorinated rubber, oleo resinous varnishes, ethyl cellulose, nitro cellulose, as well as other binders employed in standard baking enamels. Also, any of the pigments suitable for incorporation in resinous films may be employed in the base coat in accordance with this invention. Examples of such pigments are titanium dioxide, toluidine red, clays, silicates and metallic pigments such as aluminum flake. Other modifying agents familiar to the paint formulator such as solvents, wetting agents, driers, anti-settling agents, anti-flooding agents and mar-proofing agents may be employed. Examples of such agents are petroleum solvents, lecithin, cobalt naphthenate, aluminum stearate, silicone oils and wax dispersions.

The top coat or texture agent used in accordance with this invention is more specific in its composition than the base coat. The formulation is dependent upon the particular dispersed and dissolved resins being used. The use of vinyl chloride and vinyl chloride copolymers in dispersed and dissolved form is preferred. Modifying agents such as other resins, solvents, diluents, dispersants, plasticizers and pigments are added to the resinous binder. Other dispersed resins may be used in the texture coat. Examples of these are polyvinyl acetate latex, polystyrene latex, polystyrene-butadiene latex, vinylidene chloride latex and polyethylene. Other dissolved resins than polyvinyl chloride-polyvinyl acetate and melamine resins may be used in the texture coat. Examples of these are polyesters, urea-formaldehyde, phenolic, and epoxy resins.

Permissive and preferred ranges of each ingredient, more particularly the dispersed and dissolved resins in the texture coat, are interdependent upon one another. The great variety of dispersed and dissolved resins that may be used and their varying physical characteristics will affect the proportionate amounts used. For example, the viscosity of the dissolved resin which may be affected by solvent used or molecular weight of the particular polymer will affect the amount of dispersed resin necessary to create the desired texture. In a similar fashion the particle size and dispersant of the dispersed resin will affect the amount or selection of dissolved resin. Such combinations would be infinite in variety but the essential thing is that the combination of dispersed and dissolved resins in the texture coat will form a desirable pattern when applied over the dissimilar base coat.

It is believed, however, that anyone skilled in the art can without the exercise of any invention utilize the herein-described teachings of our present invention in order to make the desired finishes.

Subject to the foregoing considerations it has been found that, in general, satisfactory results are obtained with about 10 to 50 parts of total dispersed resin, about 10 to 50 parts of total dissolved resin (not counting dissolved melamine resin), and about 1 to 20 parts of melamine resin, the parts being by weight, based on the total solids contained in the texture composition (as measured by heating a sample of the composition at 135° C. for 16 hours). Especially desirable results are obtained when the above proportions are, respectively, about 20–40 parts, about 20–40 parts, and about 5–15 parts.

In general, the method of attaining textured finishes in accordance with the present invention is carried out as follows:

(1) A base coat is formed on any surface to be coated, such as metal, wood, textile, or plastic. The coating is formed by conventional procedures, such as spraying, roller coating or dipping. A wet film thickness of about 1 to 4 mils is found to be desirable for most purposes.

(2) The base coat is permitted to dry in air at room temperature until it is set to touch, i.e., the solvent has evaporated to such a point that the film is tacky but will not wet the finger under slight pressure therewith.

(3) The top coat is sprayed over the thus-air dried coating, whereupon texturing is observed almost immediately. A wet thickness of from about 0.5 mil to about 1 mil has been found satisfactory for most practical purposes, although, as in the case of the base coat, thicknesses smaller or greater than those stated may be used.

(4) The resulting textured material is baked at an elevated temperature until a tough, leather-like, textured finish substantially free of solvent has been obtained. In general, elevated temperatures from about 150° F. to about 320° F., and baking periods from about 60 minutes to about 10 minutes, depending on the baking temperature, are found to give the desired finishes.

The textured finishes obtained in accordance with this invention are useful, as already indicated, as coatings on metal, wood, plastics, textiles, etc., for applications such as office and vending machines, furniture, wall coverings, fiberglass molded plastics, etc. In addition, it has been found that the textured finishes of this invention possess an unexpectedly high order of exterior durability, unlike other textured finishes in general, as well as superior surface abrasion resistance. The latter property is desirable in providing finishes with high mar-resistant characteristics. As a result of the exterior durability of the herein-disclosed textured finishes, they lend themselves to uses such as coatings for the exteriors of motor vehicles.

In order to clarify further the present invention, the following examples are given for purposes of illustration and not limitation. All of the parts are by weight unless otherwise specified.

EXAMPLE I

Base coat composition

A white base coat for a leather-like finish is prepared as follows:

The following ingredients were charged into a heavy duty paste mixer:

24 parts of titanium dioxide (Cyanamid OR–540)
1 part of zinc oxide (N.J. Zinc XX2)
0.5 part of aluminum stearate (Metasap medium gel)
20 parts of short oil soya-alkyd solution, 50% solids in xylol, said soya-alkyd being the reaction product of about 41 parts of phthalic anhydride, 26 parts of glycerol, and 33 parts of fatty acids derived from a mixture of about 90 parts of soya bean oil and about 10 parts of castor oil (e.g., Am. Cyanamid Rezyl 387–5).

After a homogeneous paste has been formed it is ground on a 3 roll paint mill to a 7 North Standard fineness of grind and then added to the following ingredients in a blending tank and mixed therewith:

36.5 parts of short oil soya-alkyd (Rezyl 387–5)
5 parts of melamine-formaldehyde resin solution, 50% solids in a mixture of 80 parts of butanol and 20 parts of xylol, said solution having a Gardner-Holdt viscosity of G–M at 25° C. and a specific gravity of 0.997–1.008 (e.g., Resimene 876, Monsanto)
6 parts of naphtha (varnish makers and painters)
7 parts of xylol.

The resulting composition is used as the base coat composition in accordance with this invention. It requires reduction to spray viscosity (e.g., 21 sec. on #2 Zahn cup) with toluol prior to being sprayed on a surface to be painted. Normal application pressures of 10 to 20 lbs. liquid and 40 to 60 lbs. air pressure on standard spray equipment with standard application techniques are used. A wet film thickness of about 1 to 4 mils is sufficient for most applications. The base coat is allowed to dry as aforesaid. This drying normally requires about 1 to 2 minutes.

Texture coat composition

The following ingredients are charged into a pebble mill and ground for 8 hours:

9.1 copolymer of vinyl acetate-vinyl chloride resin dispersion type (Bakelite VYCM)
6.8 maleic treated vinyl chloride-vinyl acetate copolymer solution type (Bakelite VMCH)
2.3 hydroxylated vinyl chloride-vinyl acetate copolymer solution type (Bakelite VAGH)
8.2 melamine-formaldehyde resin, 66% solids in xylol, and having a Gardner-Holdt viscosity of Z–Z$_4$ at 25° C. and a specific gravity of 1.060–1.075 (Resimene 882, Monsanto)
2.2 polyethylene dispersed in xylol 50% (Semet Solvay)
4.5 dioctyl phthalate plasticizer (Bakelite)
.3 cadmium stabilizer (Argus Chemical Mark Pl)
.6 barium stabilizer (Argus Chemical Mark M)
4.5 di-isobutyl ketone (Bakelite)
4.5 Cellosolve acetate (Bakelite)
55.2 xylol (Esso)
1.8 petroleum jelly in toluol 50% (Cheesebrough-Pond's Vaseline)

To 45 parts of the resulting base A are added 13.25 parts of titanium dioxide (OR–540 Cyanamid) and the mixture is ground on a roller mill to a 5 North Standard fineness and then mixed with 76 parts of base A, 0.75 part of zinc stabilizer (Argus Chemical Mark C), 0.75 part of epoxy stabilizer (Bakelite A5), 4 parts of di-isobutyl ketone and 4.25 parts of xylol.

The resulting white texturing composition is used at a viscosity of about 2,000 to 2,500 centipoises, as measured on a Brookfield viscosimeter, #4 spindle 20 r.p.m., at 77° F. If necessary, toluol is added to the composition to attain the desired viscosity.

A wet film of ½ to 1 mil is sprayed over the base coat. The heavier the texture coat is applied the rougher the texture. The texture is formed about 30 seconds after application of the texture coat and normally about five minutes is allowed prior to baking. The entire coating is then baked at 275° F. for 20 minutes. The resultant finish has the appearance of white leather, is tough, abrasion resistant and has excellent outdoor durability.

EXAMPLE II

Another example of a low bake material following the teachings of this invention is given below. This material, which resembles a glossy black leather finish may be used on fiberglass reinforced polyester moldings or similar products requiring a low bake.

*Base coat.*—A paste "B" is prepared by mixing the following in a heavy duty paste mixer:

0.85 part carbon black
7.65 parts short oil alkyd (387–5 Rezyl American Cyanamid)

The resulting paste is ground on a three roll paint mill to a fineness of 7 North Standard.

Then add in a mixing tank the following ingredients:

8.5 parts paste "B"
19.5 parts short oil alkyd (Rezyl 387–5, American Cyanamid)
1.75 parts melamine formaldehyde resin (Resimene 876, Monsanto)
6.25 parts varnish makers and painters naphtha (Esso)
6.25 parts xylol (Esso)
0.25 part 6% iron naphthanate dried (Nuodex)
0.12 part 6% manganese naphthanate drier (Nuodex)
0.12 part 6% cobalt naphthanate drier (Nuodex)

This base coat is reduced to 21 seconds on a Zahn viscosity cup with toluol and applied to the surface to be painted by standard spray technique. A wet film of 2 mils is satisfactory on this particular formulation. The base coat is allowed to flash dry until it is sticky but no longer wet. One to two minutes is generally sufficient.

*Texture coat.*—A black texture coat is prepared by charging into a ball mill the following base "C":

94.5 parts vinyl chloride resin dispersion type (Geon 121)
69.7 parts maleic treated vinyl chloride-vinyl acetate copolymer resin sol. type (Bakelite VMCH)
23.6 parts hydroxylated vinyl chloride-vinyl acetate copolymer resin solution type (Bakelite VAGH)
83.8 parts melamine formaldehyde resin (Resimene 882, Monsanto), 50% solids
23.6 parts tri-cresyl phosphate (Shell)
16 parts di-octyl phthalate
32 part polyethylene dispersion 50% in xylol (Semet, Solvay)
2.75 parts epoxy resin stabilizer (Bakelite ERL 2774)
5.5 parts cadmium stabilizer (Argus Mark C)
9 parts Vaseline (Cheesebrough-Pond's)
635 parts toluol (Esso)
56 parts Cellosolve acetate (Bakelite)
46 parts di-isobutyl ketone (Carbide Carbon)
1 part diethylamine (Carbide Carbon)

Grind for four hours and make a roller mill paste of the following dispersion paste "D":

.25 parts carbon black
2.5 parts base C (above)

Grind on 3 roll paint mill to grind of 7 North Standard. Add the above dispersion paste "D" as follows in a blending tank.

2.75 parts dispersion paste "D"
36.25 parts base C

.25 part cadmium stabilizer (Argus Mark C)
.25 part epoxy stabilizer (Bakelite ERL 2774)
2 parts di-isobutyl ketone (Carbide Carbon)

The texture coat is sprayed at a viscosity of 3000 cps. (may be thinned with toluol) over the air flashed base coat. The typical texturing action of the invention takes place with a wet film thickness of 1 to 2 mils. The resulting coating may be dried at 180° F. for 2 hours and the result is a glossy textured finish resembling leather. Example II is particularly useful over non-metal substrates such as polyester fiberglass moldings which cannot be baked at high temperatures and over which the leather-like textured finish gives a very pleasing appearance.

The foregoing illustrates the practice of this invention which, however, is not to be limited thereby but is to be construed as broadly as permissable in view of the prior art and limited solely by the appended claims.

What is claimed is:

1. A texturing, film-forming composition, which comprises from about 10 to about 50 percent of thermoplastic resin which is at least one member selected from the group consisting of polyvinyl chloride, co-polymers of vinyl chloride, polystyrene, copolymers of styrene and butadiene, polyvinylidene chloride and polyethylene in dispersed form, about 10 to 50 percent of a thermoplastic resin as aforesaid in dissolved form, and about 1 to 20 percent of a thermosetting melamine formaldehyde resin, said amounts being based on the total solids content of said composition.

2. A texturing composition as in claim 1, wherein (1) said thermoplastic resin in dispersed form comprises a copolymer of vinyl chloride and vinyl acetate; (2) said thermoplastic resin in dissolved form comprises (a) a maleic-modified copolymer of vinyl chloride and vinyl acetate in dissolved form and (b) a hydroxylated vinyl chloride-vinyl acetate copolymer in dissolved form; and (3) said melamine resin comprises a melamine-formaldehyde resin; and wherein the amounts of said resins are about (1) 24 percent; (2) 22 percent; and (3) 13 percent, respectively.

3. A texturing composition as in claim 1, wherein (1) said thermoplastic resin in dispersed form comprises polyvinyl chloride; (2) said thermoplastic resin in dissolved form comprises (a) a maleic-modified copolymer of vinyl chloride and vinyl acetate, and (b) a hydroxylated vinyl chloride-vinyl acetate copolymer; and (3) said melamine resin comprises a melamine-formaldehyde resin; and wherein said amounts are about (1) 35 percent; (2) 30 percent; and (3) 13 percent, respectively.

4. A texturing composition as in claim 1, wherein said thermoplastic resin in dispersed form comprises a copolymer of vinyl chloride and vinyl acetate; (2) said thermoplastic resin in dissolved form comprises (a) a maleic-modified copolymer of vinyl chloride and vinyl acetate, and (b) a hydroxylated vinyl chloride-vinyl acetate copolymer; and (3) said melamine resin comprises a melamine-formaldehyde resin; and wherein said amounts are about (1) 35 percent; (2) 30 percent; and (3) 13 percent, respectively.

5. The process for making a textured finish, which comprises forming a layer on a surface to be coated with a first coating composition which comprises a member selected from the group consisting of an alkyd resin and an oil modified alkyd resin, applying over said layer a second coating composition which comprises from about 10 to about 50 percent of thermoplastic resin which is at least one member selected from the group consisting of polyvinyl chloride, co-polymers of vinyl chloride, polystyrene, copolymers of styrene and butadiene, polyvinylidene chloride and polyethylene in dispersed form, about 10 to 50 percent of a thermoplastic resin as aforesaid in dissolved form, and about 1 to 20 percent of a thermosetting melamine formaldehyde resin, said amounts being based on the total solids content of said second composition, and curing the resulting textured system until a tough, leather-like, textured finish has been obtained.

6. The process of claim 5, wherein said first composition comprises a film-forming vehicle comprising about 56½ parts of short oil soya-alkyd resin, about 5 parts of melamine-formaldehyde resin, about ½ part of anti-settling agent and about 25 parts of paint pigments; and said second composition comprises a texturing film-forming composition as set forth in claim 2.

7. The process of claim 5, wherein said first composition comprises a film-forming vehicle comprising about 27.2 parts of a short oil soya-alkyd resin, about 1.75 parts of melamine-formaldehyde resin, about 0.5 part of paint drier and about 0.85 part of carbon black; and said second composition comprises a texturing film-forming composition as set forth in claim 3.

8. Article comprising a structure having thereon a cured, textured, tough, leather-like coating comprising a lower layer of a resin selected from the group consisting of an alkyd resin and a modified alkyd resin; and a top layer comprising a mixture of thermoplastic resin and thermosetting melamine-formaldehyde resin, said mixture being formed from a composition comprising about 10 to about 50 percent of a thermoplastic resin which is at least one member selected from the group consisting of polyvinyl chloride, copolymers of vinyl chloride, polystyrene, copolymers of styrene and butadiene, polyvinylidene chloride and polyethylene, in dispersed form, about 10 to 50 percent of a thermoplastic resin as aforesaid, in dissolved form, and about 1 to 20 percent of a thermosetting melamine-formaldehyde resin, said amounts being based on the total solids content of said composition.

References Cited in the file of this patent
UNITED STATES PATENTS

| | | |
|---|---|---|
| 2,385,920 | Jenkins | Oct. 2, 1945 |
| 2,491,102 | Fowde | Dec. 13, 1949 |
| 2,575,046 | Chavannes et al. | Nov. 13, 1951 |
| 2,612,456 | Thacker et al. | Sept. 30, 1952 |